3,734,937
DERIVATIVES OF α-HALO-α-BENZYL
PROPIONIC ACID
Sandor Karady, Elizabeth, Seemon H. Pines, Murray Hill, Manuel G. Ly, Edison, and Meyer Sletzinger, North Plainfield, N.J., assignors to Merck & Co., Inc., Rahway, N.J.
No Drawing. Filed June 24, 1970, Ser. No. 49,540
Claims priority, application Canada, Mar. 25, 1970, 78,424
Int. Cl. C09b 11/04
U.S. Cl. 260—395                     1 Claim

ABSTRACT OF THE DISCLOSURE

A new method of preparing L-α-hydrazino-β-phenylalkanoic acids and their derivatives by direct hydrazino displacement of a corresponding α-substituted-β-phenylalkanoic acid or derivative is disclosed. The preparation of the novel intermediate compounds is also described.

---

This invention describes a new method of preparing certain α - hydrazino - β - phenylalkanoic acids and their derivatives. More particularly, it describes a method of preparing L-α-hydrazino-β-hydroxyphenyl alkanoic acid and their derivatives. It further describes a method of preparing certain chemical compounds which are new and useful intermediates in the synthesis of the above compounds.

It is known in the art that various α-hydrazino-β-phenylalkanoic acids are useful as decarboxylase inhibitors. It is further known that the D-isomer of these acids is generally inactive and may even be antagonistic to the action of the L-form, thereby reducing its potency.

This invention describes novel and useful chemical compounds and to the process for their preparation. More particularly, this invention describes novel compounds which are intermediates in the preparation of L-α-hydrazino-β-phenylalkanoic acids and their derivatives.

The present invention provides a new method of preparing the L-stereoisomeric compounds of Formula I

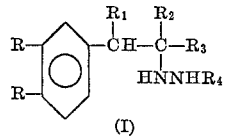

(I)

where

R is hydrogen or hydroxy;
$R_1$ is hydrogen or lower alkyl;
$R_2$ is hydrogen or lower alkyl;
$R_3$ is carboxy, loweralkoxycarbonyl, metaloxycarbonyl, organocatoxycarbonyl, amido or cyano; and
$R_4$ is hydrogen or acyl.

It is to be understood that the L-configuration is in reference to the absolute configuration on the α-carbon in relation to the hydrazine.

This invention further provides new methods of preparing valuable intermediate compounds which are useful in the preparation of the compounds of Formula I. These intermediate compounds are described by Formula II.

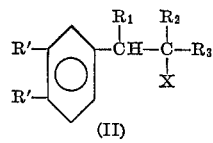

(II)

where

X is chloro, bromo, iodo, arylsulfonyl (such as phenylsulfonyl, o-, m- and p-tolylsulfonyl, acenaphthene-5-sulfonyl, 5 - indanesulfonyl, etc.) loweralkylsulfonyl (such as methylsulfonyl, etc.);
R' is hydrogen, hydroxy, lower alkoxy, aralkoxy; and
$R_1$, $R_2$ and $R_3$ are as previously described.

We have found that the compounds of Formula I can be conveniently prepared by reacting the compounds of Formula II with hydrazine, an acyl hydrazine or the alkali-metal salt of a hydrazine.

We have also found that the intermediate compounds of Formula II can be conveniently prepared.

We have found that this hydrazino displacement reaction can be used in preparing the compounds in their desired L-stereoisomeric form and thereby eliminate costly and complicated separation procedures.

A more preferred embodiment of this invention described the preparation of the L-stereoisomeric compound of Formula III:

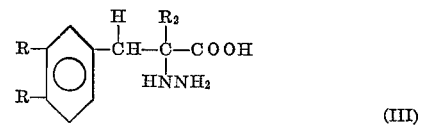

(III)

where R and $R_2$ are as described above.

A most preferred embodiment of this invention describes the preparation of L-α-(3,4-dihydroxybenzyl)-α-hydrazinopropionic acid and L-β-(3,4-dihydroxyphenyl)-α-hydrazinopropionic acid.

In the above descriptive portions of Formulae I–III, the following definitions apply:

The "lower alkyl" radical signifies an alkyl group containing from 1 to about 6 carbon atoms which can be straight chained or branched.

The term "metal" refers to an alkali or alkaline earth metal.

The term "organocatoxy" refers to any organic cation formed from a positively charged atom or radical such as cyclohexylamine, triethylamine, phenethylamine and the like. It is formed when these bases react with the carboxy group to form salts of the structure given in the formula.

The "lower alkoxy" radical signifies an alkoxy group containing from 1 to about 6 carbon atoms which can be straight chained or branched.

"Aralkoxy" refers to an arylalkoxy group, the aryl portion of which may be one or more phenyl or naphthyl radicals attached to an α-alkoxy radical which contains from 1 to about 4 carbon atoms. The preferable aralkoxy groups are benzyl, diphenylmethyl, trityl, naphthylmethyl and substituted benzyl and the like groups. Such substituents may include lower alkyl such as o-methylbenzyl, lower alkoxy such as 3,4-veratryl and 4,4′,4″-trimethoxytrityl and the like.

The "acyl" radical may be any organic radical derived from an organic acid by the removal of the hydroxyl group. It includes such radicals derived from carboxylic acids, sulfonic acids and the like.

"Aryl" refers to phenyl, naphthyl and substituted phenyl which may be lower alkyl or lower alkoxy substituents.

The present invention may be practiced by condensing a hydrazine, an acyl hydrazine or an alkali-metal salt of a hydrazine with an α-substituted-alkanoic acid or derivative of Formula II. The starting material should be one in which the α-position contains a bromo, iodo, chloro or other good leaving group such as any acylsulfonyl or alkylsulfonyl group. Such leaving groups may be phenylsulfonyl, o-, m- and p-tolylsulfonyl, acenaphthene-5-sulfonyl, 5-indanesulfonyl, methylsulfonyl, etc.

When the protected D-amino compound is diazotized it may be converted to the D-bromo compound of Formula II. This may then be hydrolyzed or reduced to remove any protecting groups on the 3,4-hydroxy positions. Displacement with hydrazine, an acylhydrazine or an alkali-metal salt of hydrazine may then proceed with inversion to yield L-hydrazino product.

The protected L-amino compound may be used also by carrying out the displacement with retention or with two inversions. The protected L-bromo compound is treated with potassium iodide in alcohol to yield protected D-iodo compound which reacts with hydrazine or alkali-metal salt.

The above displacement reaction may be carried out on the acid, acid salt, nitrile, amide or ester starting material and result in the hydrazino-acid, hydrazino-nitrile, hydrazino-amide or hydrazino-ester product. If desired, after the intermediate is prepared which has the proper α-leaving group, the acid salt, nitrile, amide or ester may then be hydrolyzed to the acid in the conventional manner before the leaving group is acted upon by hydrazine. The ester group present may be any ester which will hydrolyze in the conventional manner but preferably is the lower alkyl ester.

The following reaction sequence describes the method of this invention:

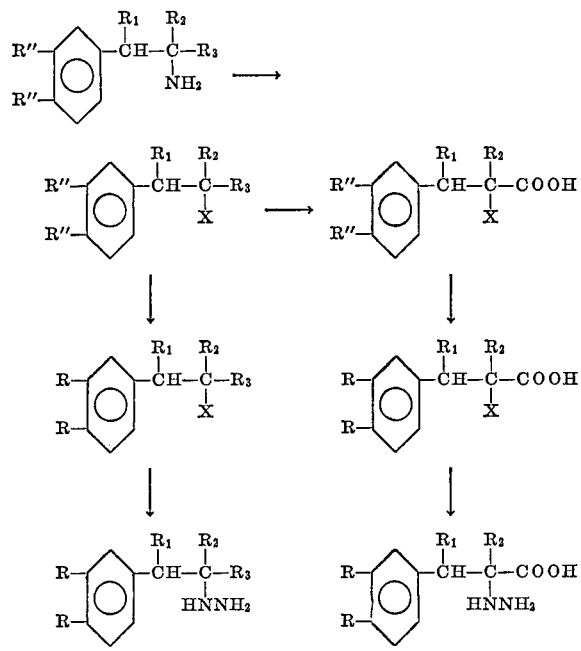

where
R″ is hydrogen, loweralkoxy, or aralkoxy; and
R, $R_1$, $R_2$, $R_3$ and X are as described above.

The following examples are given to illustrate the invention and are not intended to limit it in any manner.

EXAMPLE 1

To a mixture of 23.9 g. (0.1 mole) of L-α-amino-α-(3,4-dimethoxybenzyl)propionic acid [J. Org. Chem. 29, 1424 (1964)] in 200 ml. of acetic acid containing 10% by weight of hydrogen bromide is added 10.35 g. (0.15 mole) of sodium nitrite in 20 ml. of water 5–10° C. The mixture is stirred for two hours at 5–15° C. then cautiously with stirring warmed to 50° C. The mixture is filtered through sintered glass, the filtrate concentrated in vacuo. The residue is taken up in chlorofrom, washed with water, dried over magnesium sulfate and concentrated. The residue is crystallized from methanol-water to obtain L-α-bromo-α-(3,4 - dimethoxybenzyl)propionic acid.

A mixture of L-α-bromo-α-(3,4-dimethoxybenzyl)propionic acid (38.8 g., 0.13 mole) and 600 ml. of concentrated hydrochloric acid are heated in a sealed tube at 120° C. for 2 hours. The resulting mixture is evaporated to dryness in vacuo and the product extracted out with ethanol and evaporated to dryness to obtain L-α-bromo-α-(3,4-dihydroxybenzyl)propionic acid.

To a solution of 27.5 g. (0.1 mole) of L-α-bromo-α-(3,4-dihydroxybenzyl)propionic acid in 200 ml. of methanol is added 20 g. of potassium iodide and the mixture is refluxed for 2 hours. The mixture is cooled, 5.0 g. of 96% hydrazine added and the mixture again refluxed for 2 hours. On cooling, the mixture is concentrated to dryness in vacuo, the residue taken up in chloroform-water, the chloroform solution washed with water and saturated salt solution and the chloroform extract dried over magnesium sulfate. The mixture is concentrated to dryness and the residue crystallized from methanol-water to obtain L - α - (3,4-dihydroxybenzyl)-α-hydrazinopropionic acid (M.P. 208° dec.).

When L - α - amino - α - (3,4-dimethoxybenzyl)propionic acid is replaced in the above procedure by L-α-amino - α - (3 - methoxybenzyl)propionic acid, L-β-(3,4-dimethoxyphenyl)-α-aminobutanoic acid or L-α-amino-β-(3,4-dimethoxyphenyl)propionic acid, the product obtained is L - α - (3-hydroxybenzyl)-α-hydrazinopropionic acid, L - β - (3,4 - dihydroxyphenyl) - α - hydrazinobutanoic acid or L - β - (3,4 - dihydroxyphenyl)-α-hydrazinopropionic acid.

When L - α - amino - α - (3,4-dimethoxybenzyl)propionic acid is replaced in the above procedure by L-α-amino - α - (3,4 - dimethoxybenzyl)propionitrile or L-α-amino - α - (3,4-dimethoxybenzyl)propionitrile or L-α-amino - α - (3,4 - dimethoxybenzyl)propionamide, the product obtained is L - α - (3,4 - dihydroxybenzyl)-α-hydrazinopropionitrile or L - α - (3,4 - dihydroxybenzyl)-α-hydrazinopropionamide.

EXAMPLE 2

To a mixture of 39.1 g. (0.1 mole) of D-α-amino-α-(3,4-dibenzyloxybenzyl)propionic acid in 200 ml. of acetic acid containing 10% by weight of hydrogen bromide is added 10.35 g. (0.15 mole) of sodium nitrite in 20 ml. of water 5–10° C. The mixture is stirred for two hours at 5–15° C., then cautiously with stirring warmed to 50° C. The mixture is filtered through sintered glass, the filtrate concentrated in vacuo. The residue is taken up in chloroform, washed with water, dried over magnesium sulfate and concentrated to dryness in vacuo to obtain D - α - bromo - α - (3,4-dibenzyloxybenzyl)-propionic acid.

A mixture of D - α - bromo - α - (3,4-dibenzyloxybenzyl)propionic acid (45.5 g., 0.1 mole) in diglyme (300 ml.) is hydrogenated at 1 atm. of hydrogen and room temperature over 1.5 g. of platinum oxide until the uptake is 2 moles of hydrogen. The mixture is concentrated to dryness in vacuo and the residue extracted with methanol and filtered. The methanolic filtrate is concentrated to dryness in vacuo and the residue is D - α - bromo - α - (3,4-dihydroxybenzyl)propionic acid.

To a solution of 27.5 g. (0.1 mole) of D-α-bromo-α-(3,4-dihydroxybenzyl)propionic acid in 200 ml. of methanol is added 5.0 g. of 96% hydrazine. The mixture is refluxed for 2 hours. On cooling, the mixture is concentrated to dryness in vacuo, the residue taken up in chloroform-water, the chloroform solution washed with water and saturated salt solution and the chloroform extract dried over magnesium sulfate. The mixture is concentrated to dryness to obtain L - α - (3,4-dihydroxybenzyl)-α-hydrazinopropionic acid (M.P. 208° dec.).

The starting material for this synthesis is obtained as follows: D - α - acetylamino - α - (3,4-dibenzyloxybenzyl) propionitrile (41.6 g., 0.1 mole) is added at −10° C. to a saturated solution of hydrogen chloride in water. After the mixture is allowed to stand overnight at 0° C. it is concentrated to an oil in vacuo. Under nitrogen the amide (residue) is refluxed with 500 ml. of 2 N hydrochloric acid for 5 hours.

The mixture is concentrated to dryness in vacuo at 50° C. taken up in 200 ml. of absolute ethanol, filtered and the filtrate adjusted to pH 6.4 with diethylamine. The crude product is recrystallized from methanol-water to yield D - α - amino - α - (3,4-dibenzyloxybenzyl)propionic acid.

EXAMPLE 3

When hydrazine is replaced in the above examples by N-sodiohydrazine, the corresponding product is obtained.

When hydrazine is replaced in the above examples by N-acetylhydrazine, the product obtained is the N-acetyl derivative which may be hydrolyzed with acid as above to obtain the corresponding product.

When potassium iodide in the above example is replaced with the silver salt of benzenesulfonic acid, methanesulfonic acid or o-, m- or p-toluenesulfonic acid, the corresponding α-benzenesulfonyl, α-methylsulfonyl, the corresponding α-benzenesulfonyl, α-methylsulfonyl, or α-(o-, m- or p-tolylsulfonyl) compound is prepared. These α-substituted compounds may then be reacted with the hydrazine as above to obtain the corresponding product.

What is claimed:
1. A compound of the formula:

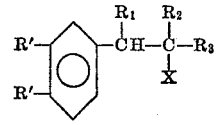

where

X is chloro, bromo, or iodo;
R' is hydroxy, lower alkoxy, aralkoxy selected from the group consisting of benzyloxy, diphenylmethyloxy, trityloxy, naphthylmethyloxy, o-methylbenzyloxy, 3,4-veratryloxy and 4,4',4''-trimethoxytrityloxy;
$R_1$ is hydrogen or lower alkyl;
$R_2$ is hydrogen or lower alkyl; and
$R_3$ is carboxy.

References Cited

Finar, I. L.: Organic Chemistry, vol. I (1963), pub. by Richard Clay & Co., Great Britain (QD251F56), p. 595 relied on.

LORRAINE A. WEINBERGER, Primary Examiner

L. A. THAXTON, Assistant Examiner

U.S. Cl. X.R.

260—465 E, 470, 471 A, 515 A, 518 R, 519, 520, 521 A, 562 H, 999